Dec. 17, 1963 R. L. PESHEL ETAL 3,114,512

LOW POWER TAPE DRIVE MECHANISM

Filed July 31, 1961 2 Sheets-Sheet 1

INVENTORS
Robert L. Peshel
BY Leonard M. Hoffman

Townsend and Townsend
attorneys

INVENTORS
Robert L. Peshel
BY Leonard M. Hoffman
Townsend and Townsend
attorneys United States Patent Office 3,114,512
Patented Dec. 17, 1963

3,114,512

LOW POWER TAPE DRIVE MECHANISM

Robert L. Peshel and Leonard M. Hoffman, both of San Carlos, Calif., assignors to Precision Instrument Company, San Carlos, Calif., a corporation of California Filed July 31, 1961, Ser. No. 127,925
5 Claims. (Cl. 242—55.12)

This invention relates to a tape drive mechanism.

It is the ultimate objective in many tape drive units to provide a device which will operate on extremely low power. Such devices are important in applications where it is necessary to drive the tape for a prolonged period of time under conditions where power requirements are considerably limited, such as for example in the instrumentation portion of a missile or in unmanned randomly located tape units.

In a conventional tape drive for carrying the tape from the feed reel to the take up reel past the transducer it is necessary that the tape be in a relatively taut condition as the tape is drawn past the transducer. To obtain such a taut condition it is necessary that some tensioning device be applied to the feed reel or to the tape between the feed reel and the transducer in order to hold the tape under requisite tension as it is being driven across the transducer. The braking force necessary to hold the tape taut must be overcome by the consumption of power. This is a serious limitation where low power consumption is of prime importance.

It is the principal object of this invention to provide a novel tape drive device in which there is no drag artificially induced in the fed reel or the tape system so that the only drag that must be overcome has relatively low friction.

The object of this invention is to provide an endless loop of film which completes a loop around the tape carried by both the feed and take up reels wherein the film generally travels with the tape from the feed to the take-up reels and then through a film drive mechanism back to the feed reel.

The entire drive of the tape occurs because of the frictional force between the film and the tape. The system provides a constant tension which will allow tape to be drawn against the face of the transducer without the necessity of pressure pads. This factor alone eliminates a considerable amount of frictional drag.

Another object of this invention is to provide in a closed loop tape drive system the combination of a take up spindle which automatically compensates for the different lineal rates of travel around differential radii between the tape and the film. The take up spindles can allow for tape to be taken up or let out as the relative speed or velocity differential between the take up and feed reels varies. By means of the take up spindle there need be no slippage between the film and the tape.

Other objects of the present invention will become apparent upon reading the following specification and referring to the accompanying drawings in which similar characters of reference represent corresponding parts in each of the several views.

Figure 1:
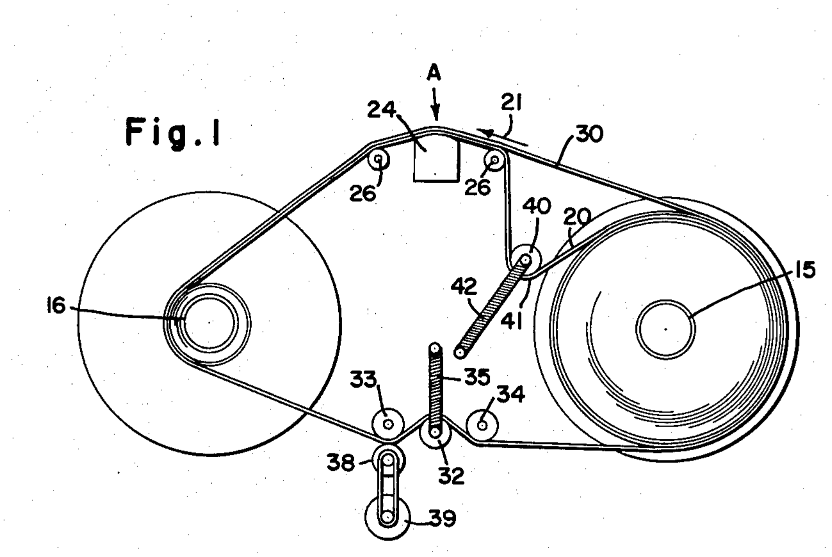
FIG. 1 is a top plan view showing the tape drive unit of this invention with the feed reel having a larger diameter of tape than the take up reel.

Referring now to the drawings there is provided a tape drive mechanism having a feed reel 15 and a take up reel 16.

Tape 20 is threaded to travel from the feed reel to the take up reel in the direction as indicated by arrow 21.

A transducer 24 is arranged in contact with the tape as the tape is drawn from feed reel 15 to take up reel 16.

Guide spindles 26 are provided on both sides of the transducer in guiding contact with both the supply and the take up sides of the transducer. The spindles and transducer 24 are arranged so that the tape will travel at a consistent angle across the transducer regardless of the relative size of tape on supply or feed reel 15 and take up reel 16.

The drive mechanism for the tape consists of a belt or film 30 formed in an endless loop about tape 20 on feed reel 15 and take up reel 16.

The film is held under taut conditions by a film take up spindle 32. The film is supported by two film guide spindles 33 and 34 with take up spindle 32 being spring urged by a spring 35 inwardly against the two spindles 33 and 34.

The actual drive of film 30 occurs through a capstan 38 driven by a motor 39. Capstan 38 is arranged to compress the film agaınst rotatable guide 33 to impart linear motion thereto.

The film is held taut by the action of spindle 32 by a spring arranged between the two spindles 33 and 34. Guide spindle 33 acts as a pinch roller as well as a guide so that it is enabled to perform both the function of guiding and forming an abtument or pinch roller against which capstan 38 can drive the tape.

The spindles 26, 32, 33 and 34 as well as the tape hubs carrying reels 15 and 16 are carried by low friction bearings so that there will be a minimum impedance to the free travel of the tape. Film 30 may be of known magnetic recording type tape base, e.g. Mylar polyester film preferably formed in a spliceless loop of tape or may be formed of any special acetate or other similar non-resilient plastic material. The more durable plastic materials are believed superior due to the fact that the film is being continuously driven and much of the surface is in active engagement with the tape or another component during operation.

Figures 2, 3:
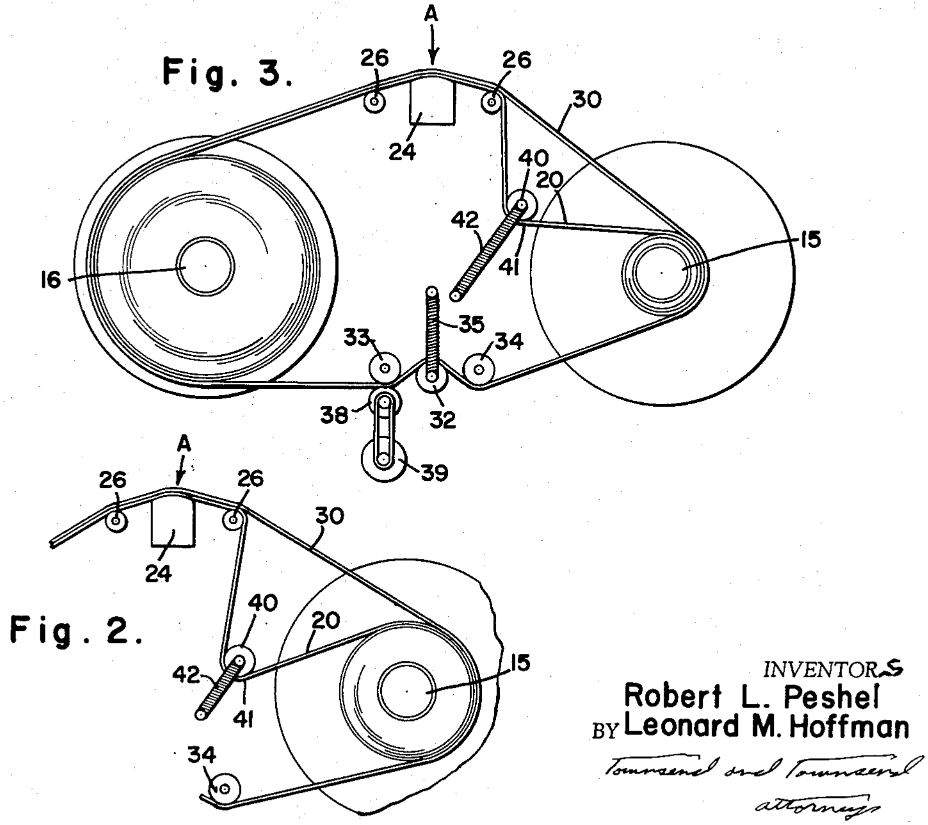
FIG. 2 is a fragmentary enlarged view showing the tape drive of this invention in a condition in which the tape on both of the reels extends out to substantially the same diameter.
FIG. 3 is a view similar to FIG. 1 showing the tape in the condition wherein the take up reel has a substantially larger diameter than the feed reel.

The total operation of the loop will be approximately the same in all the three conditions as shown in FIGS. 1, 2 and 3 wherein FIG. 1 shows the extreme condition wherein the tape is all on reel 15 ready to be wound onto reel 16.

In FIG. 2 the reels are arranged to have approximately equal distribution of tape and in FIG. 3 the opposite condition to FIG. 1 occurs wherein substantially all the tape has been rolled onto the receiving or take up reel 16.

The active length of film 30 will remain substantially the same in that the diameter of the take up reel increases proportionately with the decrease in diameter of the feed reel.

Even though the active length of film 30 remains substantially constant there is an uneven force which tends to drive the tape faster on the larger reel than on the smaller reel. This is due to the fact that the medium radius point of film 30 must travel at a faster rate than the medium radius point of the outer layer of tape on reel 15 in FIG. 1. This is due to the fact that film is wound around a larger diameter face than the top layer of the tape. Due to this fact the velocity of the tape delivered from supply reel 15 will be greater than the velocity of the tape being taken up by take up reel 16. This is because the take up reel during the condition, as shown in FIG. 1, is of a smaller diameter than the supply reel.

During the condition as shown in FIG. 3 the opposite will occur, that is the velocity of the tape feeding onto the take up reel will be greater than the velocity of the tape being supplied from supply reel 15. The change is not particularly significant but in a three inch reel would amount to a difference of several inches between the condition as shown in FIG. 2 and the condition as shown in FIG. 1. The condition will reverse itself, of course, from the condition of FIG. 2 to the condition of FIG. 3.

To compensate for the variation in velocity take up roller 40 is provided against the tape portion at 41 of tape 20.

Take up roller 40 is spring urged by a spring 42 in order to take up the slack as it develops due to the change of velocity between the two reels. Take up spindle or roller 40 thus automatically accommodates the change of velocity so that there need be no slippage between take up roller 40 and magnetic recording tape 20. This is very important where linear travel of tape is a necessary pre-requisite for good magnetic recording.

The take up spindles provide for adequate tensioning of the driving film so that there is a substantially constant pressure against the magnetic tape. The apparatus thus affords a substantially constant drive unit with requisite qualities of low wow and flutter characteristics.

It can be seen that tape will let out during all phases of tape transport when the supply reel is larger than the take up reel. The largest loop will occur during the interval that both the supply reel and the take up reel are of the same tape diameter. Thereafter the loop will become smaller in size progressively as the take up reel becomes increasingly larger than the supply reel.

Figure 4:
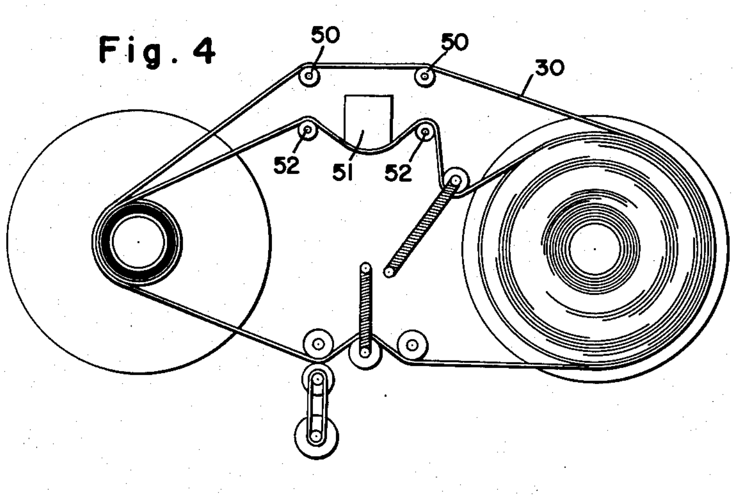
FIG. 4 is another alternative embodiment of the invention in which the transducer is mounted between the tape and the drive film.

Referring now to FIG. 4 it may be desirable in many instances to have the film contact the magnetic oxide coating of the tape. This is desirable because the magnetic oxide offers more frictional resistance for union with the driving film than the uncoated face of the tape.

In FIG. 4 the film is provided with a general drive mechanism identical to that shown in FIGS. 1, 2, and 3 and bears identical reference numerals except for the fact that guides 50 are arranged to space the film above the transducer 51 and the tape is arranged to be guided by virtue of guides 52 over the inwardly directed face of the transducer. In this way the oxide coating can be facing outwardly on the tape. This provides a drive system in which the highest frictional surface of the tape is engaged by the drive film.

Figure 5:
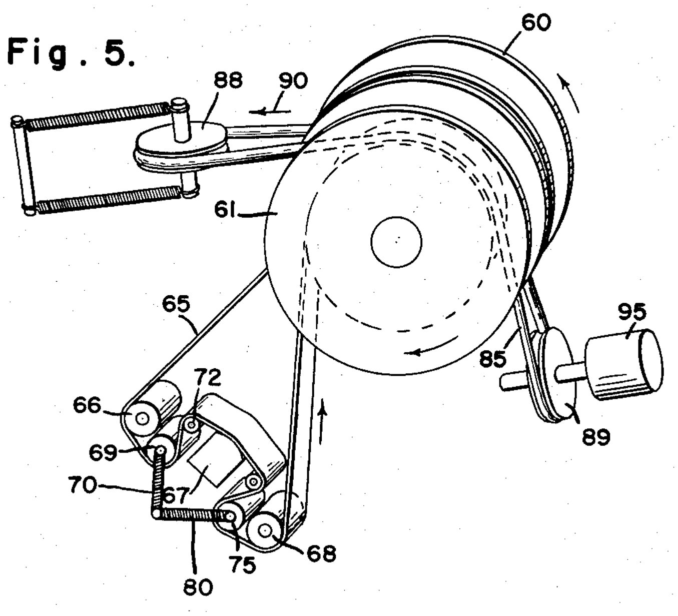
FIG. 5 is a perspective view of a modification of the invention showing the application of the principal two reels mounted in stacked relationship.

In FIG. 5 there is provided an alternative drive unit in which a feed reel 60 is mounted in axial alignment with the take up reel 61.

The magnetic tape 65 is arranged to be fed out from the feed reel around a guide roller 66 across a transducer 67 and around a second guide reel 68 to take up reel 61.

The tape stretch between the transducer and the first or guide roller 66 is held taut by a resiliently mounted roller 69. Roller 69 is biased by a spring 70 so that there is sufficient tension against the loop to maintain the constant tape tension across transducer 67. An appropriate guide 72 is mounted adjacent the transducer so that the tape path across the transducer may be consistent.

The tape stretch on the take up side of the transducer is provided with a similar tensioning roller 75 urged by a mechanism such as spring 80 to hold the tape stretch between the transducer and take up reel 61 under substantially constant tension.

The means to drive the tape includes a film 85 arranged to be carried over the top face of tape 65 on both of the reels 60 and 61. Film 85 is held taut by two pulleys 88 and 89. Pulley 88 is provided with spring tension so that the tension of the film will remain constant. Film 85 is driven in the direction indicated by arrows 90 by a capstan drive mechanism 95.

In this device film 85 will cause both the reels 60 and 61 to rotate. The speed of rotation is determined by the contact of the tape and the film due to the fact that the radius contact of the film with the tape on the two reels 60 and 61 involves a differential in velocity. Due to the fact that the top layer of tape is at a slightly smaller radius than the film going across the tape there will be a difference in velocity of the tape relative to the film. The smaller the diameter of the tape on the reel the greater will be the difference in velocity of the tape either taken off or fed out of the respective reels. This will result in the reels playing out or taking in tape at unequal rates unless there is slippage between the film and the tape. Slippage, however, is undesirable in that it introduces mechanical vibration in the system which results in either wow or flutter. Therefore to eliminate any possibility of slippage the resiliently mounted rollers or tensioning devices 69 and 75 are provided to accommodate the unequal distribution of tape from one reel to the other.

In this way any differential in velocity of tape take up as compared with feed out from the reels is compensated for by the tensioning mechanism in such a way as to maintain consistent tensioning across the transducer without the introduction of slippage between the tape and film.

Although the foregoing invention has been described in some detail by way of illustration and example for purposes of clarity of understanding, it is understood that certain changes and modifications may be practiced within the spirit of the invention as limited only by the scope of the appended claims.

We claim:

1. A magnetic tape drive unit comprising; a tape supply reel and a spaced tape take up reel, magnetic tape on the reels and extending between the reels, an endless loop of non-resilient film incapable of substantial elastic stretching, the film being in frictional driving contact with an outer layer of tape on both the supply and take up reels, separate means biasing the film loop to continually hold the film loop in substantially taut condition and against the outer layer of tape on both the supply and take up reels, means to drive the film in a direction to carry the tape from the supply reel to the take up reel, a magnetic transducer in contact with the tape between the supply reel and the take up reel, a tape take up roller in contact with the tape between the supply and take up reels, resilient means positioned to bias the take up roller and tape away from the film loop with sufficient force to maintain a variable size bight of tape under substantially constant pressure during reeling or unreeling to thereby enable the tape to be drawn across the transducer under substantially constant tension without the introduction of slippage between the tape and the film.

2. A magnetic tape drive unit as defined in claim 1 wherein the tape, film, and transducer are positioned and arranged such that the film urges the tape against the transducer.

3. A magnetic tape drive unit as defined in claim 1 wherein said take up roller is positioned to contact the tape between the transducer and supply reel.

4. A magnetic tape drive unit according to claim 1 and wherein said take up and supply reels are mounted in substantially coplanar relation.

5. A magnetic tape drive unit according to claim 1 and wherein said take up and supply reels are mounted in coaxial relationship.

(References on following page)

References Cited in the file of this patent

UNITED STATES PATENTS

| | | |
|---|---|---|
| 1,319,447 | Wood | Oct. 21, 1919 |
| 1,806,375 | Tiedeman | May 19, 1931 |
| 2,548,981 | Kemp | Apr. 17, 1951 |
| 2,658,398 | Masterson | Nov. 10, 1953 |
| 2,709,596 | Pettus | May 31, 1955 |
| 2,937,816 | Wood | May 24, 1960 |

FOREIGN PATENTS

| | | |
|---|---|---|
| 698,262 | France | Nov. 17, 1930 |
| 270,050 | Great Britain | May 5, 1927 |
| 343,893 | Great Britain | Feb. 20, 1931 |